United States Patent
Lawrence

(10) Patent No.: US 10,001,382 B1
(45) Date of Patent: Jun. 19, 2018

(54) APPARATUSES, METHODS AND SYSTEMS FOR AN EVENTUAL EVENT CALENDARING PLATFORM

(75) Inventor: David N. Lawrence, New York, NY (US)

(73) Assignee: Goldman Sachs & Co. LLC, New York, NY (US)

( * ) Notice: Subject to any disclaimer, the term of this patent is extended or adjusted under 35 U.S.C. 154(b) by 370 days.

(21) Appl. No.: 13/238,289

(22) Filed: Sep. 21, 2011

Related U.S. Application Data

(60) Provisional application No. 61/386,440, filed on Sep. 24, 2010.

(51) Int. Cl.
*G06F 17/30* (2006.01)
*G01C 21/36* (2006.01)
*G06Q 10/10* (2012.01)

(52) U.S. Cl.
CPC ....... *G01C 21/362* (2013.01); *G06Q 10/1093* (2013.01)

(58) Field of Classification Search
CPC .................................................. G01C 21/362
USPC ........................................................ 707/769
See application file for complete search history.

(56) References Cited

U.S. PATENT DOCUMENTS

| | | | |
|---|---|---|---|
| 6,732,080 B1* | 5/2004 | Blants | 705/7.18 |
| 7,209,955 B1* | 4/2007 | Major et al. | 709/207 |
| 7,584,114 B2* | 9/2009 | Estrada et al. | 705/7.23 |
| 2003/0149606 A1* | 8/2003 | Cragun et al. | 705/8 |
| 2004/0141005 A1* | 7/2004 | Banatwala et al. | 345/751 |
| 2004/0143472 A1* | 7/2004 | Estrada et al. | 705/8 |
| 2007/0198648 A1* | 8/2007 | Allen et al. | 709/207 |
| 2007/0220063 A1* | 9/2007 | O'Farrell et al. | 707/201 |
| 2008/0098313 A1* | 4/2008 | Pollack | 715/753 |
| 2008/0126476 A1* | 5/2008 | Nicholas et al. | 709/203 |
| 2008/0162253 A1* | 7/2008 | Lee et al. | 705/9 |
| 2009/0216569 A1* | 8/2009 | Bonev et al. | 705/5 |
| 2009/0254971 A1* | 10/2009 | Herz et al. | 726/1 |
| 2009/0276723 A1* | 11/2009 | Narayanan et al. | 715/769 |
| 2011/0071878 A1* | 3/2011 | Gingras et al. | 705/8 |

* cited by examiner

*Primary Examiner* — Tony Mahmoudi
*Assistant Examiner* — Michael Le

(57) ABSTRACT

The APPARATUSES, METHODS AND SYSTEMS FOR AN EVENTUAL EVENT CALENDARING PLATFORM (hereinafter "EECP") transforms inputs (e.g., user information, user profile information, event information, import calendar information, etc.) via components (e.g., Event Retrieval Component, Event Collection Component, Event Assignment Component, Eventually Button, Event Collection and Scoring Component, Event Calendaring Component, etc.) into outputs (e.g., user calendar, user calendar RSS feed, user profile, etc.). The EECP provides dynamic, management, analysis, and control of event information and relationships. In one embodiment, the EECP may be configured to provide a user with a calendar implementation that may be populated with events based on the user's identified interests, preferences and historical activity.

20 Claims, 4 Drawing Sheets

Example EECP Data Flow

Example EECP Data Flow

Figure 2     EVENT CALENDARING Component

Figure 3     EVENT COLLECTION & SCORING Component

APPARATUSES, METHODS AND SYSTEMS FOR AN EVENTUAL EVENT CALENDARING PLATFORM

This application for letters patent disclosure document describes inventive aspects directed at various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

RELATED APPLICATIONS

This application claims priority under 35 USC § 119 to U.S. provisional patent application Ser. No. 61/386,440 filed Sep. 24, 2010, entitled "APPARATUSES, METHODS AND SYSTEMS FOR AN EVENTUAL EVENT CALENDERING PLATFORM". The entire contents of the aforementioned application are herein expressly incorporated by reference.

FIELD

The present invention is directed generally to an apparatuses, methods, and systems for generating event and activity relationships, and more particularly, to APPARATUSES, METHODS AND SYSTEMS FOR AN EVENTUAL EVENT CALENDARING PLATFORM.

BACKGROUND

Activities take place everyday, at various times, in various locations, and host various people. People use tools like calendars to plan and prepare for activities.

BRIEF DESCRIPTION OF THE DRAWINGS

The accompanying appendices and/or drawings illustrate various non-limiting, example, inventive aspects in accordance with the present disclosure.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

EECP

This disclosure details APPARATUSES, METHODS AND SYSTEMS FOR AN EVENTUAL EVENT CALENDARING PLATFORM (hereinafter "EECP") that transforms inputs (e.g., user information, user profile information, event information, import calendar information, etc.) via components (e.g., Event Retrieval Component, Event Collection Component, Even Assignment Component, Eventually Button, Event Collection & Scoring Component, Event Calendaring Component, etc.) into outputs (e.g., user calendar, user calendar RSS feed, user profile, etc.). The EECP provides dynamic, management, analysis, and control of event information and relationships. In one embodiment, the EECP may be configured to provide a user with a calendar implementation that may be populated with events based on the user's identified interests, preferences and historical activity.

Figure 1:
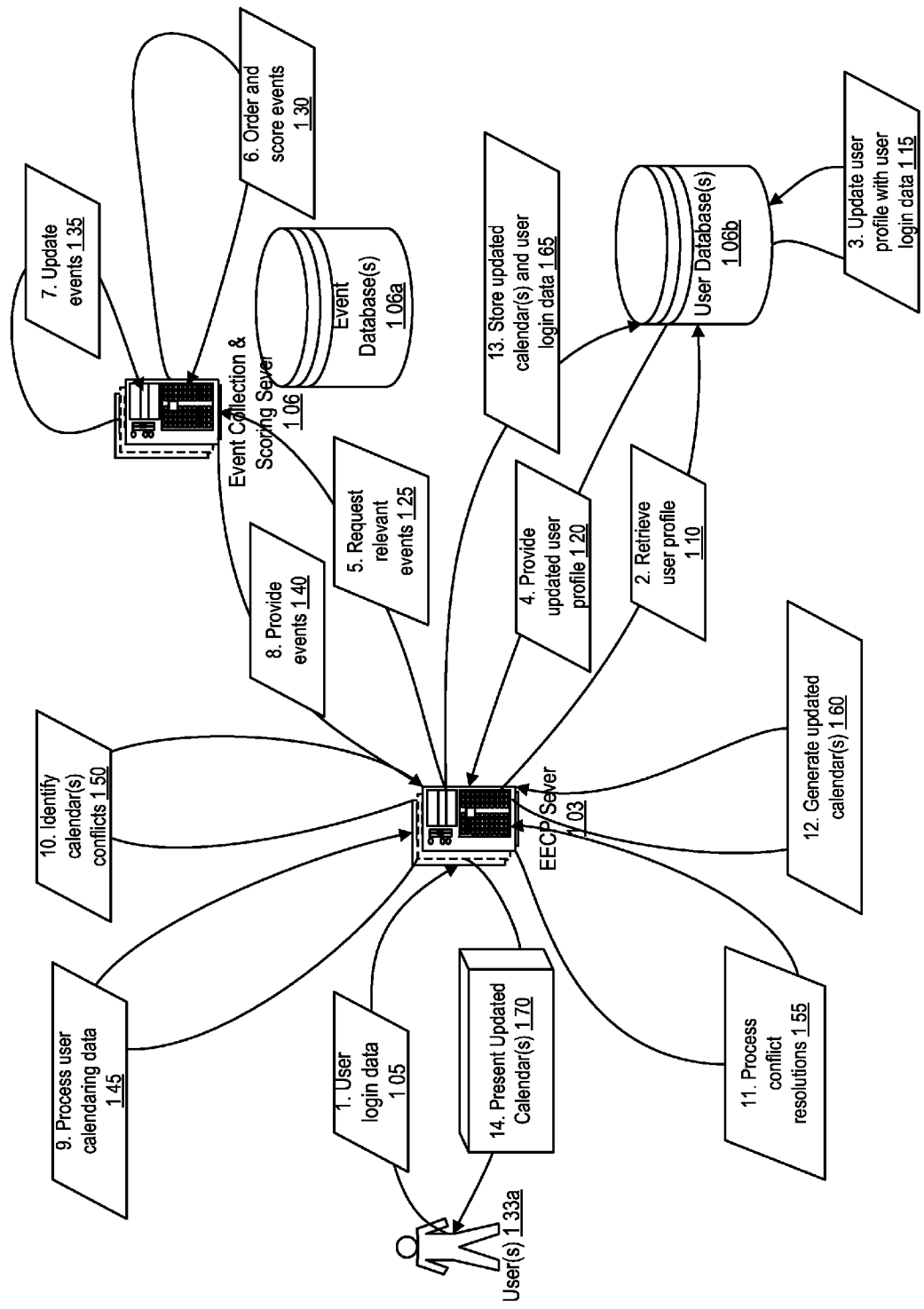
FIG. 1 shows a data flow diagram illustrating example aspects of some embodiments of the EECP.

FIG. 1 shows a data flow diagram illustrating example aspects of some embodiments of the EECP. It is to be understood the processes illustrated in FIG. 1 are not restrictive and may be customized based on the requirements of various administrative users including, and not limited to, merchant administrators, account administrators, product heads, even administrators, and/or the like. As shown in FIG. 1, a user may provide user login information 105 and receive processed calendaring information 170 generated based on the user login information 110-160. In some embodiments a user's profile may be retrieved 110 from a user database 106b structured to maintain user profile information and user segmentation information. Also, as shown, events may be accessed by an event server 106 where events may be updated and associated with a user's login data and user profile 135. For example, a user's profile may indicate an interest in football games, an event server may collect all relevant football game events. In some embodiments, the collected events may be scored according to various degrees of relevance. For example, an event may be more highly scored than another event because it falls within an opening in a user's calendar where no events (or low priority, tentative events) are scheduled. In another example, an event may be more highly ranked than another event if said event is associated with more than one user profile interest. FIG. 1 also shows that calendar conflicts 150, once identified, may be resolved according to relevant events and a user's profile 155. Once resolved, in some embodiments, an updated calendar may be generated to be populated with the various calendar conflict resolutions 160.

Figure 2:
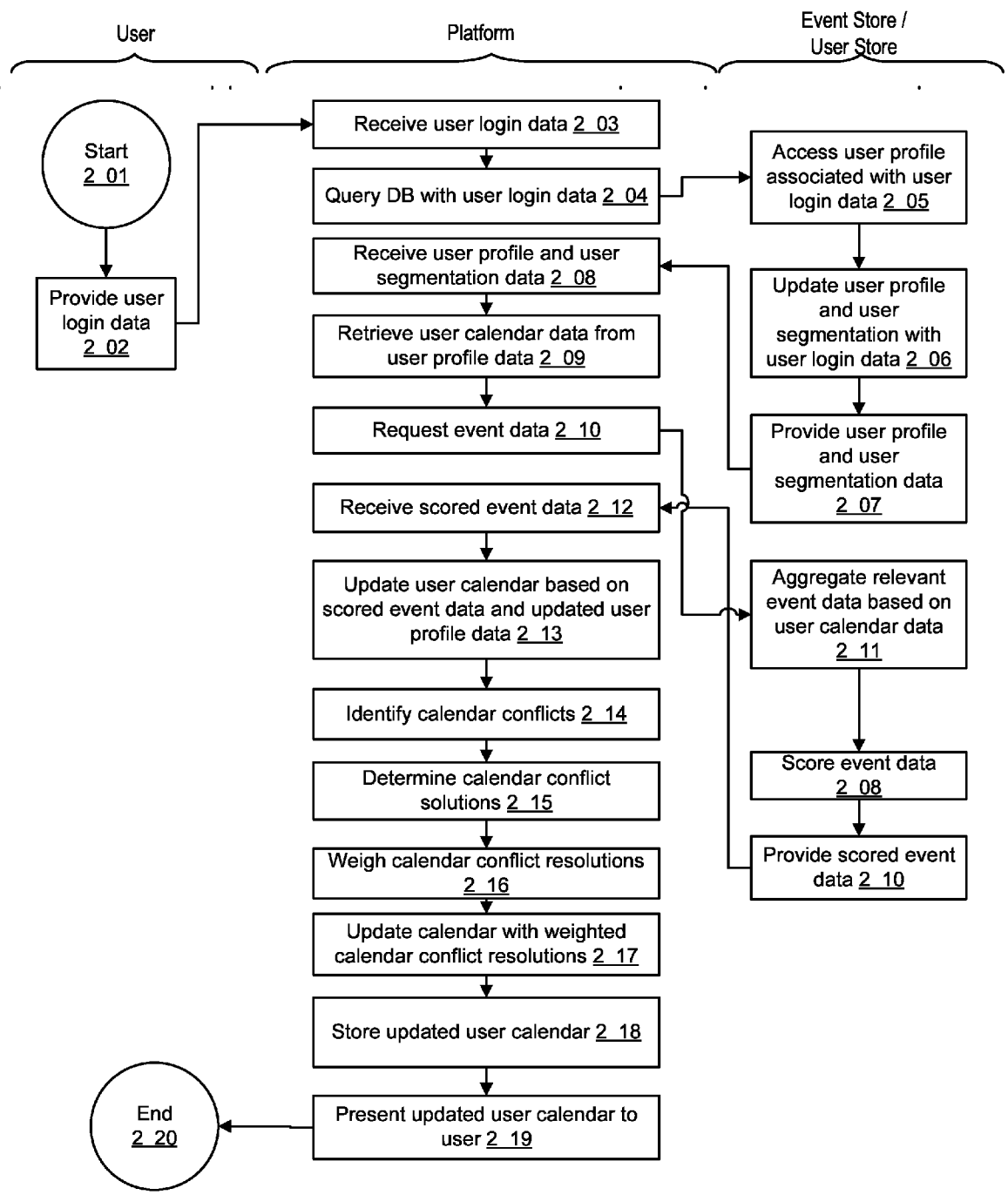
FIG. 2 is a logic flow diagram illustrating an embodiment of the EECP.

FIG. 2 is a logic flow diagram illustrating an embodiment of the EECP. As shown in FIG. 2, user login data may effectuate retrieval of event related information that may be curated and ordered according to an interest/preference relevancy to the user 203-212. In some embodiments, calendar conflicts may be weighed, and so may calendar conflict resolutions 217. Ultimately, in some embodiments, a number of calendars may be generated based on the user's profile, user login data, retrieved events, and weighted calendar conflict resolutions 218-219.

Figure 3:
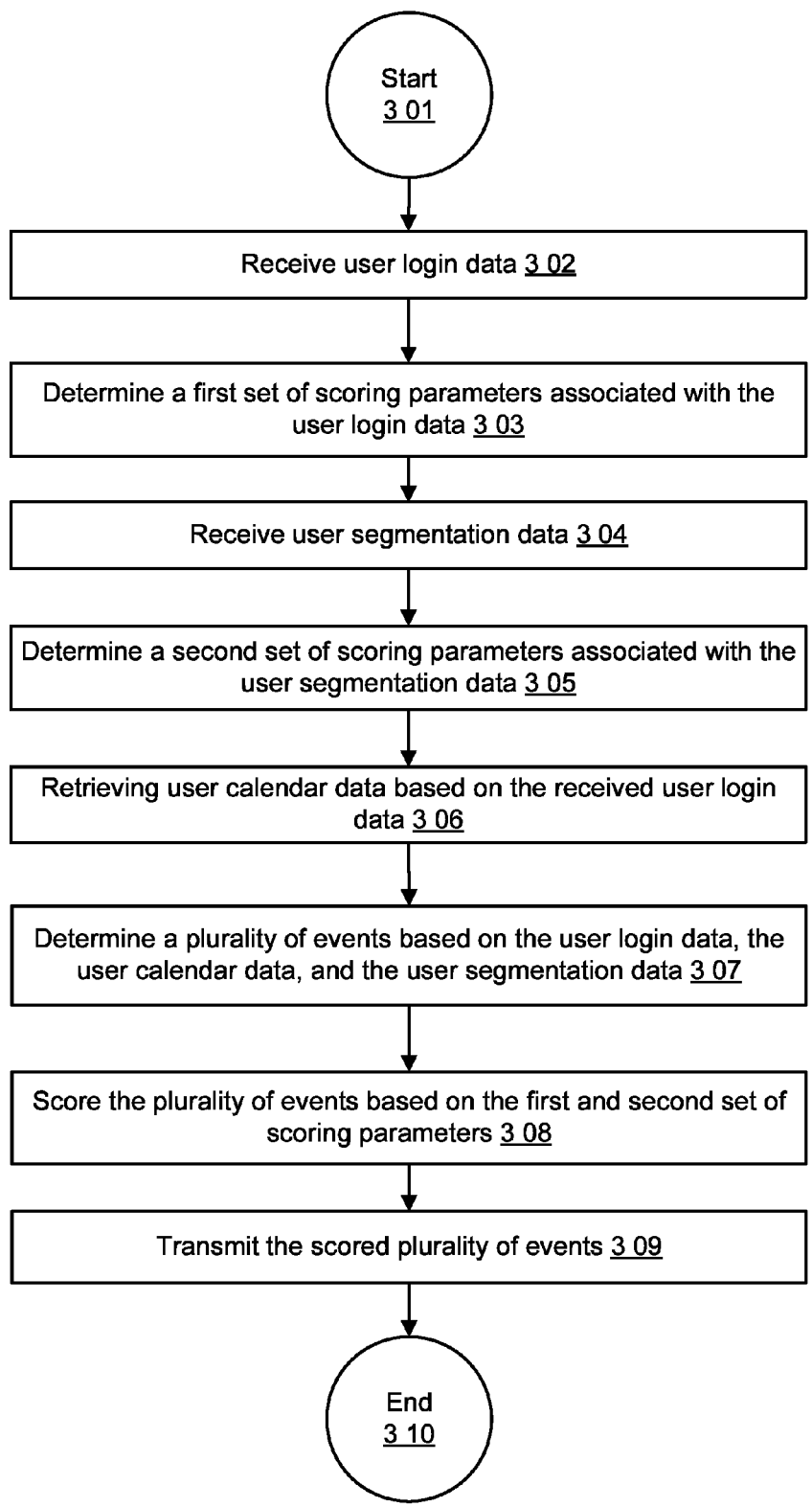
FIG. 3 is a logic flow diagram illustrating an embodiment of the EECP.

FIG. 3 is a logic flow diagram illustrating an embodiment of the EECP. FIG. 3 shows an exemplary process by which event data may be gathered and scored according to a user's login data. In some embodiments a plurality of scoring parameters may be derived 303, 305 from historical statistical analysis comprising, but not limited to, user segmentation trends and historical and real-time event data (i.e., event turnouts, user ratings, etc.).

In another embodiment, the EECP may be configured to provide recommended action options based on populated calendars.

In another embodiment, the EECP may be configured to search and collect event information. In such an embodiment the EECP may be configured to organize event information according to an assortment of variables (e.g., event type, event location, event audience, event duration, event frequency, event "freshness", source "freshness," etc.), wherein said variables are used to structure events (past, present and future) for "global' event storage and maintenance and/or for "local," user specific, maintenance and usage.

In one embodiment, the EECP may be configured to include Event Database, an Event Source Database, an Event Retrieval Component, Event Collection Component, Event Assignment Component, User Profiles, User Calendars, Calendar Export Component, User Databases, and/or the like.

In one embodiment, the EECP may be configured to process interests and preferences and push events associated with processed interests and preferences to various implementations (e.g., user calendars, etc.).

In one embodiment the EECP may be configured to populate various implementations (e.g., calendars, email summaries, micro blogging streams, etc.) with events based on identified interests, and may be able to do so in real-time.

In one embodiment the EECP may be configured to allow user specific editing of interests and preferences.

Some implementations of the EECP may be configured share viewership and content with a diversity of internal and external users.

Some implementations of the EECP may be configured to export processed data, and/or sustain access of processed data to third party calendaring and event applications (e.g., Outlook, Google Calendar, iCal, etc.).

Some embodiments of the EECP may be configured to provide users with a diversity of sharing/viewing preferences/permissions, in such embodiments user may be able to edit/modify a collection of said preferences/permissions.

Some embodiments of the EECP may be configured to provide users the ability to subscribe to and/or follow the development/maintenance of a other user's EECP implementations (e.g., calendars, RSS feeds, email newsletters, etc.).

Some embodiments of the EECP may be configured to process future events (e.g., Eventuals, Eventual Events, etc.) associated with a user's based upon the user's defined interests/preferences, EECP activity history, and/or the like.

Some embodiments of the EECP may be configured to function across various third-party platforms including web applications, local mobile applications, and/or the like.

In one embodiment the EECP may be configured to process date information of articles, blog posts, tweets, etc and determine a calendar category, preference class, event, appropriate user assignment, and/or the like. Such an embodiment may be able to parse the article of less important data and transport the relevant data, or snippet of data to a descriptor of a determined event entry.

One embodiment of the EECP may be configured to provide a one-click event bookmarking implementation (e.g., Eventually Button, Eventual Button, etc.). In such an embodiment the bookmarking implementation may operate as a web widget and may maintain a connection to an embodiment of the EECP. For example, the bookmarking implementation may add/transmit event information to an EECP embodiment for processing and/or storage. Further, the bookmarking tool may instantly process the adjoining web page(s) for event related information (e.g., undefined, pre-defined, etc.) and transmit the aggregate to an EECP embodiment for further processing, storage and/or User Profile assignment.

In one embodiment the EECP may be configured to generate and update an event source database which may include comprehensive event source information comprising, as an example, ticketing sites (e.g., Ticketmaster, stubhub.com, etc.), events sites (e.g., upcoming.com, www.nycgo.com, timeout.com, etc.), entertainment venue calendars/sites (e.g., www.boweryballroom.com, etc.), social calendars, academic calendars (e.g., student-related events and activities, lectures, etc.), sports listings, sporting calendars/sites (e.g., nba.com, nfl.com, etc.), non-public sources (e.g., mailing lists, shared group calendars, employer calendars), historical collections (e.g., user's past events, attended parties, birthdays, etc.), TV listings (e.g., TV guide listings, cable TV listings, etc.), comment sections of blogs and videos, and/or the like.

In some embodiments and implementations of the EECP an event source may include digital data sources comprising event information. As non-limiting examples, websites, web pages, digital assets, social networking sources, micro blogging services, RSS feeds, SMS services, etc.

In one embodiment the EECP may be configured to process data and update a user database. In such an embodiment a user database may be structured to include user information, user profile information, and/or the like.

In one embodiment, a user profile may be directly accessible and editable by a user. In one embodiment user profiles may include security features, for example a user facing implementation of the EECP may provide a user profile accessibly by a user once the user has logged into a hosting EECP embodiment. In some embodiments and implementation a user profile may include menu interfaces and data organized according to User Information (e.g., Name, Email Address, Location, Password information, etc.), User Interests and Preferences, Privacy and Sharing Permissions, Contacts, Eventual Friends, Followed Eventual Calendars, Export, Import and Sync, and/or the like.

In some embodiments a user event database may include a user's stored events, organized/structured according to a user's user profile Interests and preferences.

In some embodiments the EECP may be configured to provide User Created Profiles/Calendars. In such embodiments users may be able to create profiles comprising interests and preferences for hypothetical people, wherein hypothetical people have been crafted according user defined profiles via the EECP. As a non-limiting example, a husband may be able to create an Eventual Calendar based on a profile he created based on his wife and her interests and preferences.

In some embodiments the EECP may be configured to provide User Calendars, which may include an editable graphical user interface that may visualize a user's Event Database, and/or the like.

In some embodiments the EECP may be configured to convert and/or generate User Calendars into ICALENDAR format (e.g., .ical, .ics, .ifb, .icalendar, etc.).

In some embodiments the EECP may be configured to convert a User Calendar into a variety of third application files types as defined by specific calendar APIs (e.g., ICAL, OUTLOOK, GOOGLE CALENDAR, etc).

In some embodiments the EECP may be configured to import calendar information from a variety of third application files types as defined by specific calendar APIs. For example, a user may be able to navigate a plurality of ICAL calendars and select a variety of calendars to import in an EECP User Calendar. In such an example a plurality of ICAL calendars may be aggregated, organized and presented by an embodiment of the EECP.

In one embodiment the EECP may be configured to operate online as a web application, via a mobile device as a web application, via a mobile device as a local 17 mobile application (e.g., ANDROID app, IPHONE application, etc.), and/or the like.

EECP Controller

Figure 4:
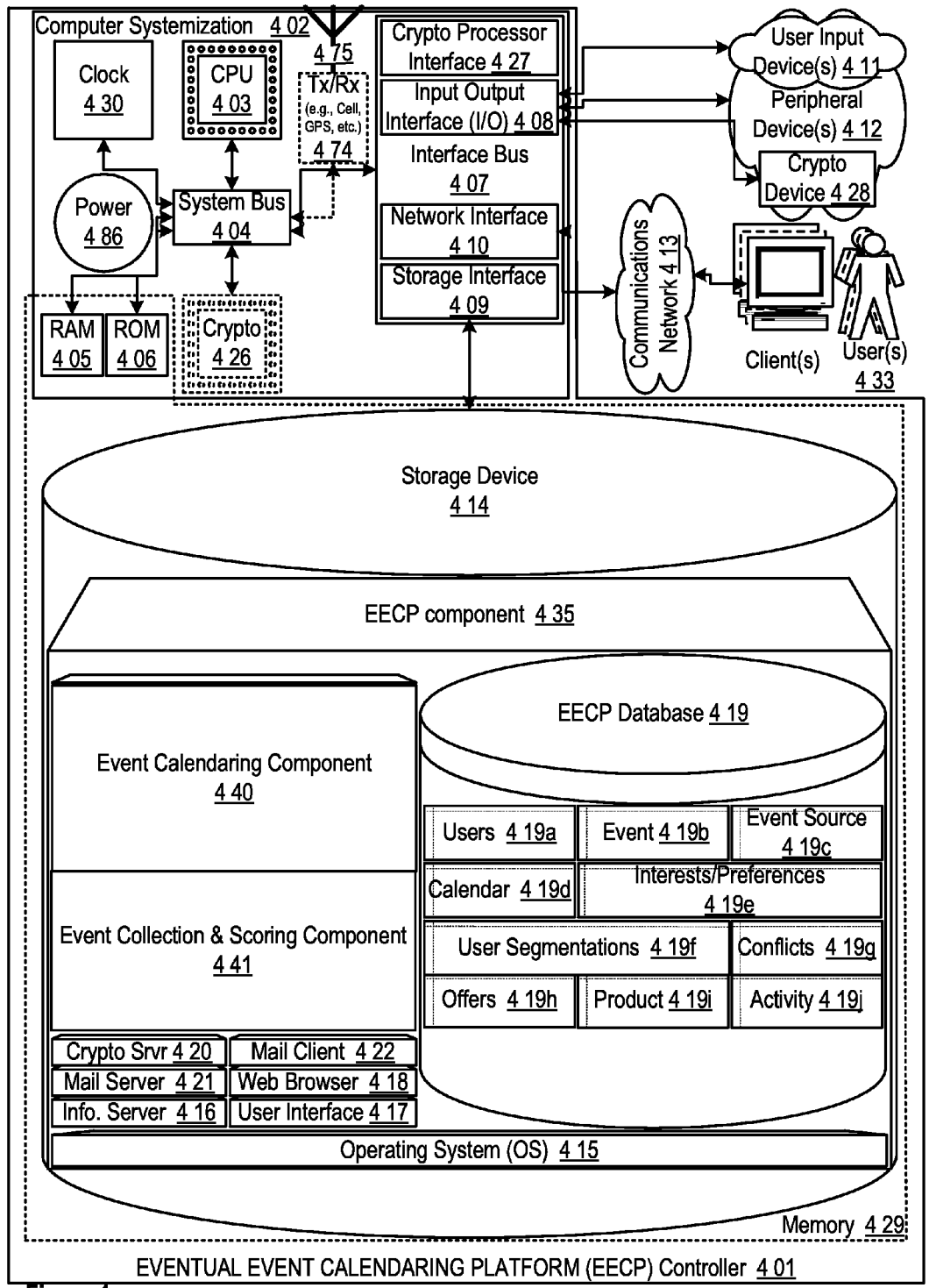
FIG. 4 is of a block diagram illustrating embodiments of the EECP controller.

FIG. 4 illustrates inventive aspects of a EECP controller 401 in a block diagram. In this embodiment, the EECP controller 401 may serve to aggregate, process, store, search, serve, identify, instruct, generate, match, and/or facilitate interactions with a computer through event searching, event collection, and event relationship generation technologies, and/or other related data.

Typically, users, which may be people and/or other systems, may engage information technology systems (e.g., computers) to facilitate information processing. In turn, computers employ processors to process information; such processors 403 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 429 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the EECP controller 401 may be connected to and/or communicate with entities such as, but not limited to: one or more users from user input devices 411; peripheral devices 412; an optional cryptographic processor device 428; and/or a communications network 413.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The EECP controller 401 may be based on computer systems that may comprise, but are not limited to, components such as: a computer systemization 402 connected to memory 429.

Computer Systemization

A computer systemization 402 may comprise a clock 430, central processing unit ("CPU(s)" and/or "processor(s)" (these terms are used interchangeable throughout the disclosure unless noted to the contrary)) 403, a memory 429 (e.g., a read only memory (ROM) 406, a random access memory (RAM) 405, etc.), and/or an interface bus 407, and most frequently, although not necessarily, are all interconnected and/or communicating through a system bus 404 on one or more (mother)board(s) 402 having conductive and/or otherwise transportive circuit pathways through which instructions (e.g., binary encoded signals) may travel to effect communications, operations, storage, etc. Optionally, the computer systemization may be connected to an internal power source 486. Optionally, a cryptographic processor 426 may be connected to the system bus. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's ATHLON, DURON and/or OPTERON; ARM's application, embedded and secure processors; IBM and/or MOTOROLA'S DRAGONBALL and POWERPC; IBM's and SONY'S CELL processor; INTEL'S CELERON, CORE (2) DUO, ITANIUM, PENTIUM, XEON, and/or XSCALE; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the EECP controller and beyond through various interfaces. Should processing requirements dictate a greater amount speed and/or capacity, distributed processors (e.g., Distributed EECP), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the EECP may be achieved by implementing a micro controller such as CAST's R8051XC2 microcontroller; INTEL'S MCS 51 (i.e., 8051 microcontroller); and/or the like. Also, to implement certain features of the EECP, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the EECP component collection (distributed or otherwise) and/or features may be implemented via the microprocessor and/or via embedded components; e.g., via ASIC, coprocessor, DSP, FPGA, and/or the like. Alternately, some implementations of the EECP may be implemented with embedded components that are configured and used to achieve a variety of features or signal processing.

Depending on the particular implementation, the embedded components may include software solutions, hardware solutions, and/or some combination of both hardware/software solutions. For example, EECP features discussed herein may be achieved through implementing FPGAs, which are a semiconductor devices containing programmable logic components called "logic blocks", and programmable interconnects, such as the high performance FPGA VIRTEX series and/or the low cost Spartan series manufactured by XILINX. Logic blocks and interconnects can be programmed by the customer or designer, after the FPGA is manufactured, to implement any of the EECP features. A hierarchy of programmable interconnects allow logic blocks to be interconnected as needed by the EECP system designer/administrator, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the EECP may be developed on regular FPGAs and then migrated into a fixed version that more resembles ASIC implementations. Alternate or coordinating implementations may migrate EECP controller features to a final ASIC instead of or in addition to FPGAs. Depending on the implementation all of the aforementioned embedded components and microprocessors may be considered the "CPU" and/or "processor" for the EECP.

Power Source

The power source 486 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 486 is connected to at least one of the interconnected subsequent components of the EECP thereby providing an electric current to all subsequent components. In one example, the power source 486 is connected to the system bus component 404. In an alternative embodiment, an outside power source 486 is provided through a connection across the I/O 408 interface. For example, a USB and/or IEEE 1394 connection carries both data and power across the connection and is therefore a suitable source of power.

Interface Adapters

Interface bus(ses) 407 may accept, connect, and/or communicate to a number of interface adapters, conventionally although not necessarily in the form of adapter cards, such as but not limited to: input output interfaces (I/O) 408, storage interfaces 409, network interfaces 410, and/or the like. Optionally, cryptographic processor interfaces 427 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 409 may accept, communicate, and/or connect to a number of storage devices such as, but not limited to: storage devices 414, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 410 may accept, communicate, and/or connect to a communications network 413. Through a communications network 413, the EECP controller is accessible through remote clients 433b (e.g., computers with web browsers) by users 433a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed EECP), architectures may similarly be employed to pool, load balance, and/or otherwise increase the communicative bandwidth required by the EECP controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 410 may be used to engage with various communications network types 413. For example, multiple network interfaces may be employed to allow for the communication over broadcast, multicast, and/or unicast networks.

Input Output interfaces (I/O) 408 may accept, communicate, and/or connect to user input devices 411, peripheral devices 412, cryptographic processor devices 428, and/or the like. I/O may employ connection protocols such as, but not limited to: audio: analog, digital, monaural, RCA, stereo, and/or the like; data: APPLE DESKTOP BUS (ADB), IEEE 1394a-b, serial, universal serial bus (USB); infrared; joystick; keyboard; midi; optical; PC AT; PS/2; parallel; radio; video interface: APPLE DESKTOP CONNECTOR (ADC), BNC, coaxial, component, composite, digital, Digital Visual Interface (DVI), high-definition multimedia interface (HDMI), RCA, RF antennae, S-Video, VGA, and/or the like; wireless: 802.11a/b/g/n/x, BLUETOOTH, code division multiple access (CDMA), global system for mobile communications (GSM), WiMax, etc.; and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 411 may be card readers, dongles, finger print readers, gloves, graphics tablets, joysticks, keyboards, mouse (mice), remote controls, retina readers, trackballs, trackpads, and/or the like.

Peripheral devices 412 may be connected and/or communicate to I/O and/or other facilities of the like such as network interfaces, storage interfaces, and/or the like. Peripheral devices may be audio devices, cameras, dongles (e.g., for copy protection, ensuring secure transactions with a digital signature, and/or the like), external processors (for added functionality), goggles, microphones, monitors, network interfaces, printers, scanners, storage devices, video devices, video sources, visors, and/or the like.

It should be noted that although user input devices and peripheral devices may be employed, the EECP controller may be embodied as an embedded, dedicated, and/or monitor-less (i.e., headless) device, wherein access would be provided over a network interface connection.

Cryptographic units such as, but not limited to, micro controllers, processors 426, interfaces 427, and/or devices 428 may be attached, and/or communicate with the EECP controller. A MC68HC16 micro controller, manufactured by MOTOROLA, INC., may be used for and/or within cryptographic units. The MC68HC16 micro controller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent micro controllers and/or processors may also be used. Other commercially available specialized cryptographic processors include: the BROADCOM'S CRYPTO NETX and other Security Processors; NCIPHER'S NSHIELD, SAFENET'S LUNA PCI (e.g., 7100) series; SEMAPHORE COMMUNICATIONS' 40 MHz ROADRUNNER 184; SUN'S Cryptographic Accelerators (e.g., ACCELERATOR 6000 PCIE Board, ACCELERATOR 500 Daughtercard); VIA NANO Processor (e.g., L2100, L2200, U2400) line, which is capable of performing 500+MB/s of cryptographic instructions; VLSI TECHNOLOGY'S 33 MHz 6868; and/or the like.

Memory

Generally, any mechanization and/or embodiment allowing a processor to affect the storage and/or retrieval of information is regarded as memory 429. However, memory is a fungible technology and resource, thus, any number of memory embodiments may be employed in lieu of or in concert with one another. It is to be understood that the EECP controller and/or a computer systemization may employ various forms of memory 429. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 429 will include ROM 406, RAM 405, and a storage device 414. A storage device 414 may be any conventional computer system storage. Storage devices may include a drum; a (fixed and/or removable) magnetic disk drive; a magneto-optical drive; an optical drive (i.e., Blueray, CD ROM/ RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 429 may contain a collection of program and/or database components and/or data such as, but not limited to: operating system component(s) 415 (operating system); information server component(s) 416 (information server); user interface component(s) 417 (user interface); Web browser component(s) 418 (Web browser); database(s) 419; mail server component(s) 421; mail client component(s) 422; cryptographic server component(s) 420 (cryptographic server); the EECP component(s) 435; and/or the like (i.e., collectively a component collection). These components may be stored and accessed from the storage devices and/or from storage devices accessible through an interface bus. Although non-conventional program components such as those in the component collection, typically, are stored in a local storage device 414, they may also be loaded and/or stored in memory such as: peripheral devices, RAM, remote storage facilities through a communications network, ROM, various forms of memory, and/or the like.

Operating System

The operating system component 415 is an executable program component facilitating the operation of the EECP controller. Typically, the operating system facilitates access of I/O, network interfaces, peripheral devices, storage devices, and/or the like. The operating system may be a highly fault tolerant, scalable, and secure system such as: APPLE MACINTOSH OS X (Server); AT&T PLAN 9; BE OS; UNIX and UNIX-like system distributions (such as AT&T's UNIX; Berkley Software Distribution (BSD) variations such as FREEBSD, NETBSD, OPENBSD, and/or the like; Linux distributions such as RED HAT, UBUNTU, and/or the like); and/or the like operating systems. However, more limited and/or less secure operating systems also may be employed such as APPLE MACINTOSH OS, IBM OS/2, MICROSOFT DOS, MICROSOFT WINDOWS 2000/2003/3.1/95/98/CE/MILLENIUM/NT/VISTA/XP (Server), PALM OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the EECP controller to communicate with other entities through a communications network 413. Various communication protocols may be used by the EECP controller as a sub carrier transport mechanism for interaction, such as, but not limited to: multicast, TCP/IP, UDP, unicast, and/or the like.

Information Server

An information server component 416 is a stored program component that is executed by a CPU. The information server may be a conventional Internet information server such as, but not limited to APACHE SOFTWARE FOUNDATION'S APACHE, MICROSOFT'S INTERNET INFORMATION SERVER, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, JAVA, JAVASCRIPT, PRACTICAL EXTRACTION REPORT LANGUAGE (PERL), Hypertext Pre-Processor (PHP), pipes, PYTHON, wireless application protocol (WAP), WEBOBJECTS, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., AMERICA ONLINE (AOL) INSTANT MESSENGER (AIM), Application Exchange (APEX), ICQ, Internet Relay Chat (IRC), MICROSOFT NETWORK (MSN) MESSENGER SERVICE, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., JABBER or OPEN MOBILE ALLIANCE'S (OMA's) Instant Messaging and Presence Service (IMPS)), YAHOO! INSTANT MESSENGER SERVICE, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the EECP controller based on the remainder of the HTTP request. For example, a request might have the IP portion of the request resolved by a DNS server to an information server at an address indicated in the IP portion; that information server might in turn further parse the http request based on another portion of the request and resolve it to a location in memory containing the information. Additionally, other information serving protocols may be employed across various ports, e.g., FTP communications across port 21, and/or the like. An information server may communicate to and/or with other components in a component collection, including itself, and/or facilities of the like. Most frequently, the information server communicates with the EECP database 419, operating systems, other program components, user interfaces, Web browsers, and/or the like.

Access to the EECP database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the EECP. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the EECP as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

The function of computer interfaces III some respects is similar to automobile operation interfaces. Automobile operation interface elements such as steering wheels, gearshifts, and speedometers facilitate the access, operation, and display of automobile resources, functionality, and status. Computer interaction interface elements such as check boxes, cursors, menus, scrollers, and windows (collectively and commonly referred to as widgets) similarly facilitate the access, operation, and display of data and computer hardware and operating system resources, functionality, and status. Operation interfaces are commonly called user interfaces. Graphical user interfaces (GUIs) such as the APPLE MACINTOSH'S Operating System's AQUA, IBM's OS/2, MICROSOFT'S WINDOWS 2000/2003/3.1/95/98/CE/MILLENIUM/NT/XP/VISTA/7 (i.e., AERO), UNIX'S X-WINDOWS (e.g., which may include additional Unix graphic interface libraries and layers such as K DESKTOP ENVIRONMENT (KDE), MYTHTV and GNU NETWORK OBJECT MODEL ENVIRONMENT (GNOME)), web interface libraries (e.g., ACTIVEX, AJAX, (D)HTML, FLASH, JAVA, JAVASCRIPT, etc. interface libraries such as, but not limited to, DOJO, JQUERY(UI), MOOTOOLS, PROTOTYPE, SCRIPT.ACULO.US, SWFOBJECT, YAHOO! USER INTERFACE, any of which may be used and) provide a baseline and means of accessing and displaying information graphically to users.

A user interface component 417 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 418 is a stored program component that is executed by a cpu. The Web browser may be a conventional hypertext viewing application such as MICROSOFT INTERNET EXPLORER or NETSCAPE NAVIGATOR. Secure Web browsing may be supplied with 128 bit (or greater) encryption by way of HTTPS, SSL, and/or the like. Web browsers allowing for the execution of program components through facilities such as ACTIVEX, AJAX, (D)HTML, FLASH, JAVA, JAVASCRIPT, web browser plug-in APIs (e.g., FIREFOX, SAFARI Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the EECP enabled nodes. The combined application may be nugatory on systems employing standard Web browsers.

Mail Server

A mail server component 421 is a stored program component that is executed by a CPU 403. The mail server may be a conventional Internet mail server such as, but not limited to SENDMAIL, MICROSOFT EXCHANGE, and/or the like. The mail server may allow for the execution of program components through facilities such as ASP, ACTIVEX, (ANSI) (Objective-) C (++), C# and/or .NET, CGI scripts, JAVA, JAVASCRIPT, PERL, PHP, PIPES, PYTHON, WEBOBJECTS, and/or the like. The mail server may support communications protocols such as, but not limited to: Internet message access protocol (IMAP), Messaging Application Programming Interface (MAPI)/MICROSOFT EXCHANGE, post office protocol (POP3), simple mail transfer protocol (SMTP), and/or the like. The mail server can route, forward, and process incoming and outgoing mail messages that have been sent, relayed and/or otherwise traversing through and/or to the EECP.

Access to the EECP mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 422 is a stored program component that is executed by a CPU 403. The mail client may be a conventional mail viewing application such as APPLE MAIL, MICROSOFT ENTOURAGE, MICROSOFT OUTLOOK, MICROSOFT OUTLOOK EXPRESS, MOZILLA, THUNDERBIRD, and/or the like. Mail clients may support a number of transfer protocols, such as: IMAP, MICROSOFT EXCHANGE, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 420 is a stored program component that is executed by a CPU 403, cryptographic processor 426, cryptographic processor interface 427, cryptographic processor device 428, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the EECP may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the EECP component to engage in secure transactions if so desired. The cryptographic component facilitates the secure accessing of resources on the EECP and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The EECP Database

The EECP database component 419 may be embodied in a database and its 18 stored data. The database is a stored program component, which is executed by the CPU; the stored program component portion configuring the CPU to process the stored data. The database may be a conventional, fault tolerant, relational, scalable, secure database such as ORACLE or SYBASE. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the EECP database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as FRONTIER, OBJECTSTORE, POET, ZOPE, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the EECP database is implemented as a data-structure, the use of the EECP database 419 may be integrated into another component such as the EECP component 435. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 419 includes several tables 419a-j. A User table 419a includes fields such as, but not limited to: a user_ID, user_email, user_calendar1, user_calendar2, user_age, user_preference1, user_preference2, user_interest1, user_interest2, and/or the like. The user table may support and/or track multiple entity accounts on a EECP. An Event table 419b includes fields such as, but not limited to: event_ID, event_type, event_class, event_duration, event_rank, event_rating, event_source, event_time, event_location, event_addressi, event_zip, event_email, event_telephone, event_link, event_descrip, and/or the like. An Event Source table 419c includes fields such as, but not limited to: eventsource_ID, eventsource_type, eventsource_class, eventsource_rank, eventsource_rating, eventsource_updatefrequency, eventsource_link, eventsource_link2, eventsource_email, eventsource_dataformat, and/or the like. A Calendar table 419d includes fields such as, but not limited to: calendar_ID, calendar_type, calendar_class, calendar_preference2, calendar_preference2, calendar_interest1, calendar_interest2, and/or the like. An Interests-Preferences table 419e includes fields such as, but not limited to: interest_ID, preference_ID, interest_type, preference_type, interest_genre, preference_genre, interest_source, preference_source, interest_rank, preference_rank, and/or the like. A User Segmentations table 419f includes fields such as, but not limited to: segmentation_ID, preference_ID, user_ID, interest_ID, event_ID, and/or the like. A Conflicts table 419g includes fields such as, but not limited to: conflict_ID, user_ID, score_value, event_ID, event_type, and/or the like. An Offers table 419h includes fields such as, but not limited to: offer_ID, conflict_ID, user_ID, interest_ID, event_ID, offer type, offer_value, and/or the like. A Product table 419i includes fields such as, but not limited to: product_ID, product type, event_ID, event type, interest_ID, and/or the like. An Activity table 419j includes fields such as, but not limited to: activity_ID, activity_type, event_ID, user_ID, and/or the like.

In one embodiment, the EECP database may interact with other database systems. For example, employing a distributed database system, queries and data access by search EECP component may treat the combination of the EECP database, an integrated data security layer database as a single database entity.

In one embodiment, user programs may contain various user interface primitives, which may serve to update the EECP. Also, various accounts may require custom database tables depending upon the environments and the types of clients the EECP may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 419a-d. The EECP may be configured to keep track of various settings, inputs, and parameters via database controllers.

The EECP database may communicate to and/or with other components in a component collection, including itself, and/or facilities of the like. Most frequently, the EECP database communicates with the EECP component, other program components, and/or the like. The database may contain, retain, and provide information regarding other nodes and data.

The EECPs

The EECP component 435 is a stored program component that is executed by a CPU. In one embodiment, the EECP component incorporates any and/or all combinations of the aspects of the EECP that was discussed in the previous figures. As such, the EECP affects accessing, obtaining and the provision of information, services, transactions, and/or the like across various communications networks.

The EECP component transforms inputs (e.g., user information, user profile information, event information, import calendar information, etc.) via components (e.g., Event Calendaring Component 440, Event Collection and Scoring Component 441, Event Retreival Component, Event Collection Component, Event Assignment Component, Eventually Button, etc.) into outputs (e.g., user calendar, user calendar RSS feed, user profile, etc.).

The EECP component enabling access of information between nodes may be developed by employing standard development tools and languages such as, but not limited to: APACHE components, Assembly, ActiveX, binary executables, (ANSI) (Objective-) C (++), C# and/or .NET, database adapters, CGI scripts, JAVA, JAVASCRIPT, mapping tools, procedural and object oriented development tools, PERL, PHP, PYTHON, shell scripts, SQL commands, web application server extensions, web development environments and libraries (e.g., MICROSOFT'S ACTIVE X; ADOBE AIR, FLEX & FLASH; AJAX; (D)HTML; DOJO; JAVA; JAVASCRIPT; JQUERY(UI); MOOTOOLS; Prototype; script.aculo.us; Simple Object Access Protocol (SOAP); SWFObject; YAHOO! User Interface; and/or the like), WEBOBJECTS, and/or the like. In one embodiment, the EECP server employs a cryptographic server to encrypt and decrypt communications. The EECP component may communicate to and/or with other components in a component collection, including itself, and/or facilities of the like. Most frequently, the EECP component communicates with the EECP database, operating systems, other program components, and/or the like. The EECP may contain, communicate, generate, obtain, and/or provide program component, system, user, and/or data communications, requests, and/or responses.

Distributed VMPS

The structure and/or operation of any of the EECP node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the EECP controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c -post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the EECP controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address='192.168.0.100';
$port=255;
// create a server-side SSL socket, listen for/accept incoming communication
$sock=socket_create(AF_INET, SOCK_STREAM, 0);
socket_bind($sock, $address, $port) or die('Could not bind to address');
socket_listen($sock);
$client=socket_accept($sock);
// read input data from client device in 1024 byte blocks until end of message do {
  $input=" ";
  $input=socket_read($client, 1024);
  $data.=$input;
} while($input !=" ");
// parse data to extract variables
$obj=json_decode($data, true);
// store input data in a database
mysql_connect("201.408.185.132",$DBserver,$password); // access database server
mysql_select("CLIENT_DB.SQL"); // select database to append
mysql_query("INSERT INTO UserTable (transmission) VALUES ($data)"); // add data to UserTable table in a CLIENT database
mysql_close("CLIENT_DB.SQL"); // close connection to database
?>
```

In order to address various issues and advance the art, the entirety of this application for APPARATUSES, METHODS AND SYSTEMS FOR AN EVENTUAL EVENT CALENDERING PLATFORM (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a EECP individual and/or enterprise user, database configuration and/or relational model, data type, data transmission and/or network framework, syntax structure, and/or the like, various embodiments of the EECP, may be implemented that enable a great deal of flexibility and customization. For example, aspects of the EECP may be adapted for product and service bidding. While various embodiments and discussions of the EECP have been directed to virtual marketplaces, however, it is to be understood that the embodiments described herein may be readily configured and/or customized for a wide variety of other applications and/or implementations.

What is claimed is:

1. A processor-implemented event calendaring method to transform event data to eventual event calendars, comprising:
receiving, by a processor from a source, calendar event data;
receiving, by the processor from a user, user calendar event interest data and user specified preferences;
storing the calendar event data in a calendar event database, wherein storing the calendar event data includes structuring the calendar event data according to event type, event frequency, and event audience;
querying the calendar event database with the user calendar event interest data;
scoring, by the processor, the query results based on historical statistical analysis, the user specified preferences, and a relationship to openings in a calendar of the user;
providing calendar event recommendations based on populated calendars of other users;
receiving selections, from the user, associated with the scored query results;
generating, by the processor, user calendar entries from the received selections; and
providing, by the processor, the generated user calendar entries to the user.

2. The method of claim 1, wherein generating the user calendar entries from the received selections produces a file in iCalendar format.

3. The method of claim 1, wherein generating the user calendar entries from the received selections produces calendar entries in iCalendar format.

4. The method of claim 1, wherein providing the generated user calendar entries includes emailing the generated user calendar entries to the user, wherein the source comprises at least two calendars, wherein the method further comprises:
aggregating the calendar event data from the at least two calendars.

5. The method of claim 1, wherein providing the generated user calendar entries includes transmitting a Really Simple Syndication (RSS) feed comprised of the generated user calendar entries.

6. The method of claim 1, wherein the received selections are automatically generated by the processor.

7. The method of claim 1, wherein historical statistical analysis includes user segmentation trends, and wherein the calendar event data is further structured according to event location and event freshness.

8. The method of claim 1, wherein the user subscribes to developments of a third party's calendar.

9. The method of claim 1, wherein scoring, by the processor, the query results is further based on a number of user profile interests associated with an event.

10. The method of claim 1, further comprising populating an email with events based on user profile interests.

11. The method of claim 1, further comprising:
processing date information of the source to determine the calendar event data.

12. The method of claim 1, further comprising:
receiving a one-click selection to bookmark an event;
processing a web page associated with the event for information related to the event; and
transmitting the information to the user profile.

13. The method of claim 1, further comprising:
identifying calendar conflicts;
determining calendar conflict resolutions;
weighing the calendar conflict resolutions; and
generating a number of calendars based at least in part on the weighted calendar conflict resolutions.

14. The method of claim 1, further comprising:
parsing data from the source to select only the data relevant to the calendar event data; and
transporting a snippet of the data relevant to the calendar event data to a descriptor of a calendar event entry.

15. The method of claim 1, wherein the calendar event data is further structured according to a freshness of the source.

16. A processor-implemented event calendaring method, comprising:
receiving, by a processor, calendar event data;
receiving, by the processor from a user, user calendar event interest data and user specified preferences;
storing the calendar event data in a calendar event database, wherein storing the calendar event data includes structuring the calendar event data according to event type, event frequency, event duration, and event audience;
querying the calendar event database with the user calendar event interest data;
scoring, by the processor, the query results based on historical statistical analysis, the user specified preferences, and a relationship to openings in a calendar of the user,
wherein historical statistical analysis includes user segmentation trends, historical event data, and real-time event data, wherein the real-time event data includes event turnouts and user ratings; and
receiving selections, from the user, associated with the scored query results.

17. The processor-implemented event calendaring method of claim 16, wherein the calendar event data is further structured according to event location and event freshness.

18. The method of claim 16, further comprising:
receiving, from the user, a profile comprising interests and preferences of a hypothetical person; and
creating a calendar for the hypothetical person based on the profile of the hypothetical person.

19. A processor-implemented event calendaring method, comprising:
receiving, by a processor, calendar event data;
receiving, by the processor from a user, user calendar event interest data and user specified preferences;
storing the calendar event data in a calendar event database, wherein storing the calendar event data includes structuring the calendar event data according to event type, event frequency, event duration, and event audience;
querying the calendar event database with the user calendar event interest data;
scoring, by the processor, the query results based on historical statistical analysis and the user specified preferences;
identifying calendar conflicts;
determining calendar conflict resolutions;
weighing the calendar conflict resolutions; and
generating a number of calendars based at least in part on the weighted calendar conflict resolutions.

20. The method of claim 19, wherein generating the number of calendars is further based on user login data, the user specified preferences, and the query results.

* * * * *